US009444249B2

(12) United States Patent
Imanishi et al.

(10) Patent No.: US 9,444,249 B2
(45) Date of Patent: Sep. 13, 2016

(54) SEMICONDUCTOR DRIVING DEVICE AND SEMICONDUCTOR DEVICE

(71) Applicant: Mitsubishi Electric Corporation, Tokyo (JP)

(72) Inventors: Motoki Imanishi, Fukuoka (JP); Kenji Sakai, Fukuoka (JP); Takaki Nakashima, Fukuoka (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 192 days.

(21) Appl. No.: 14/244,392

(22) Filed: Apr. 3, 2014

(65) Prior Publication Data

US 2015/0036252 A1 Feb. 5, 2015

(30) Foreign Application Priority Data

Aug. 5, 2013 (JP) ................................. 2013-162248

(51) Int. Cl.
*H02H 9/04* (2006.01)
*H02H 7/122* (2006.01)

(52) U.S. Cl.
CPC ............. *H02H 9/04* (2013.01); *H02H 7/1227* (2013.01)

(58) Field of Classification Search
CPC .............................. H02H 9/04; H02H 7/1227
USPC ........................................................ 361/91.5
See application file for complete search history.

(56) References Cited

U.S. PATENT DOCUMENTS

| | | | | |
|---|---|---|---|---|
| 4,989,127 A * | 1/1991 | Wegener | ................. | H02M 1/38 363/16 |
| 5,105,099 A | 4/1992 | Routh et al. | | |
| 6,333,665 B1 | 12/2001 | Ichikawa | | |
| 6,459,598 B1 * | 10/2002 | Yamamoto | ............ | H02M 7/538 363/56.01 |
| 6,529,061 B1 * | 3/2003 | Orita | .................... | H03K 17/162 327/112 |
| 6,664,822 B2 * | 12/2003 | Watabe | ................. | H02M 7/538 327/108 |
| 6,680,630 B1 | 1/2004 | Hiyama | | |
| 7,495,482 B2 * | 2/2009 | Sakai | ...................... | H02M 1/08 327/108 |
| 7,688,049 B2 * | 3/2010 | Iwabuchi | .............. | H02M 7/538 323/271 |
| 7,764,089 B2 * | 7/2010 | Iwabuchi | ................ | H02M 1/08 327/108 |
| 2005/0144539 A1 * | 6/2005 | Orita | .................... | H03K 17/162 714/48 |
| 2007/0285381 A1 | 12/2007 | Gong et al. | | |

(Continued)

FOREIGN PATENT DOCUMENTS

CN 1264955 A 8/2000
CN 1630172 A 6/2005

(Continued)

OTHER PUBLICATIONS

An Office Action issued by the German Patent Office on Apr. 13, 2016, which corresponds to German Patent Application No. 10 2014 212 520.0 and is related to U.S. Appl. No. 14/244,392; with English language translation.

(Continued)

*Primary Examiner* — Scott Bauer
(74) *Attorney, Agent, or Firm* — Studebaker & Brackett PC

(57) ABSTRACT

A semiconductor driving device includes a negative surge detection circuit and a level shifter circuit. The negative surge detection circuit detects whether the negative surge occurs at a connection point between a P-side SW element and N-side SW element. The level shifter circuit maintains a driving voltage used in driving the P-side SW element upon the negative surge detection circuit detecting occurrence of the negative surge.

10 Claims, 15 Drawing Sheets

(56) References Cited

U.S. PATENT DOCUMENTS

| | | |
|---|---|---|
| 2008/0278215 A1 | 11/2008 | Sakai et al. |
| 2008/0303580 A1 | 12/2008 | Stegmayr |
| 2013/0207704 A1* | 8/2013 | Tseng ............... H03K 19/00361 327/194 |

FOREIGN PATENT DOCUMENTS

| | | |
|---|---|---|
| CN | 101079571 A | 11/2007 |
| CN | 101304209 A | 11/2008 |
| JP | 2004-072942 A | 3/2004 |
| JP | 2007-3300096 A | 12/2007 |
| JP | 2008-306731 A | 12/2008 |

OTHER PUBLICATIONS

The First Office Action issued by the Chinese Patent Office on Jun. 1, 2016, which corresponds to Chinese Patent Application No. 201410381448.2 and is related to U.S. Appl. No. 14/244,392; with English language translation.

* cited by examiner

F I G. 1
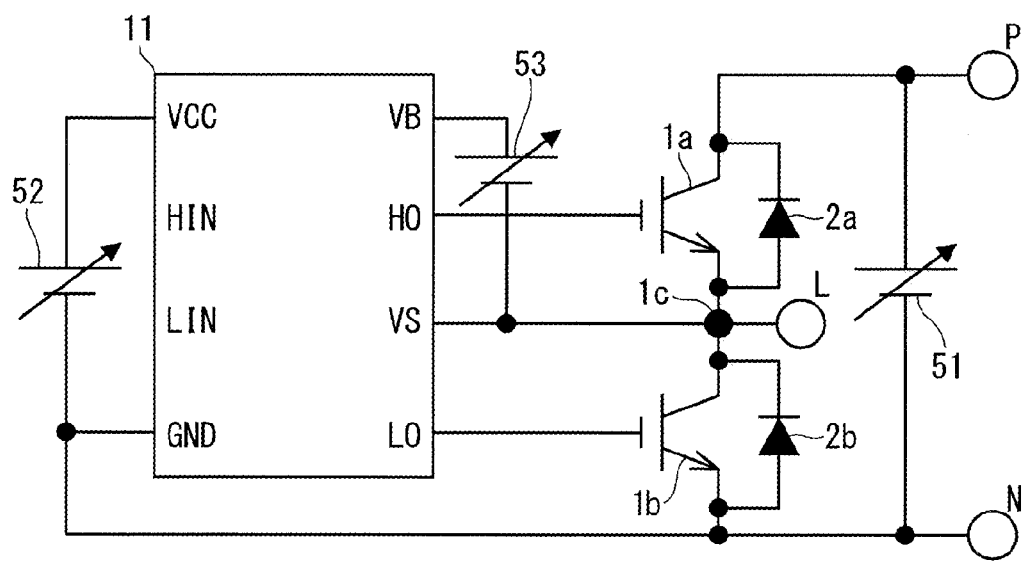

F I G. 1 4
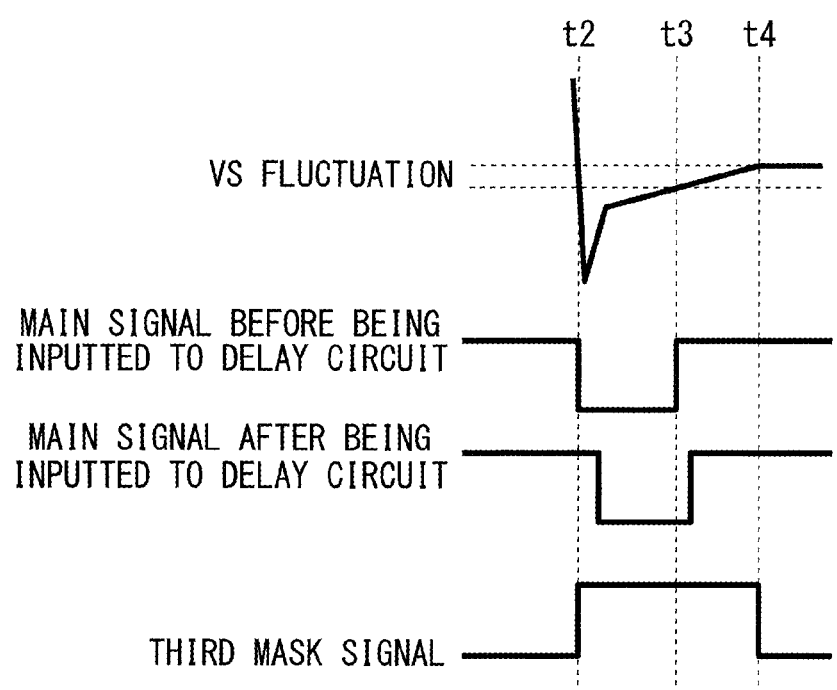

SEMICONDUCTOR DRIVING DEVICE AND SEMICONDUCTOR DEVICE

BACKGROUND OF THE INVENTION

1. Field of the Invention

The present invention relates to a semiconductor driving device capable of driving a high-voltage side semiconductor switching element and a low-voltage side semiconductor switching element connected in series between a high potential and a low potential, and relates to a semiconductor device including the semiconductor driving device.

2. Description of the Background Art

In the semiconductor driving device that drives semiconductor switching elements, such as inverters, a high-voltage side semiconductor switching element and a low-voltage side semiconductor switching element are repeatedly switched to turn on and off. Upon switching, a negative surge that causes a malfunction in a circuit occurs. A variety of techniques for suppressing an adverse effect of the negative surge have been developed (for example, Japanese Patent Application Laid-Open No. 2004-072942).

Meanwhile, the level shifter circuit including the one-shot driving circuit, the SR-FF latch circuit, the D-FF latch circuit, or the like have been used in the semiconductor driving device as described above. However, in recent times, the always-on level shifter circuit including, for example, the D latch circuit instead of the above-mentioned circuits has been developed to be used.

In the always-on level shifter circuit which has been developed in recent times, a negative surge may occur and have an adverse effect.

SUMMARY OF THE INVENTION

The present invention has been made in view of the above-mentioned problems, and an object thereof is to provide a technique capable of suppressing an adverse effect of a negative surge in a level shifter circuit including a D latch circuit, for example.

A semiconductor driving device is configured to drive a high-voltage side semiconductor switching element and a low-voltage side semiconductor switching element connected in series between a high potential and a low potential. The semiconductor driving device includes a negative surge detection circuit that detects whether a negative surge occurs at a connection point between the high-voltage side semiconductor switching element and the low-voltage side semiconductor switching element and a level shifter circuit that maintains a driving voltage used in driving the high-voltage side semiconductor switching element upon the negative surge detection circuit detecting occurrence of the negative surge.

A driving voltage used in driving a high-voltage side semiconductor switching element is maintained upon a negative surge detection circuit detecting occurrence of a negative surge. Thus, an adverse effect of the negative surge can be suppressed in a level shifter circuit including a D latch circuit, for example.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are circuit diagrams showing a configuration of a related semiconductor device;

FIG. 14 is a timing chart showing an operation of a semiconductor device according to the seventh preferred embodiment;

DESCRIPTION OF THE PREFERRED EMBODIMENTS

Related Semiconductor Device

Figure 2:
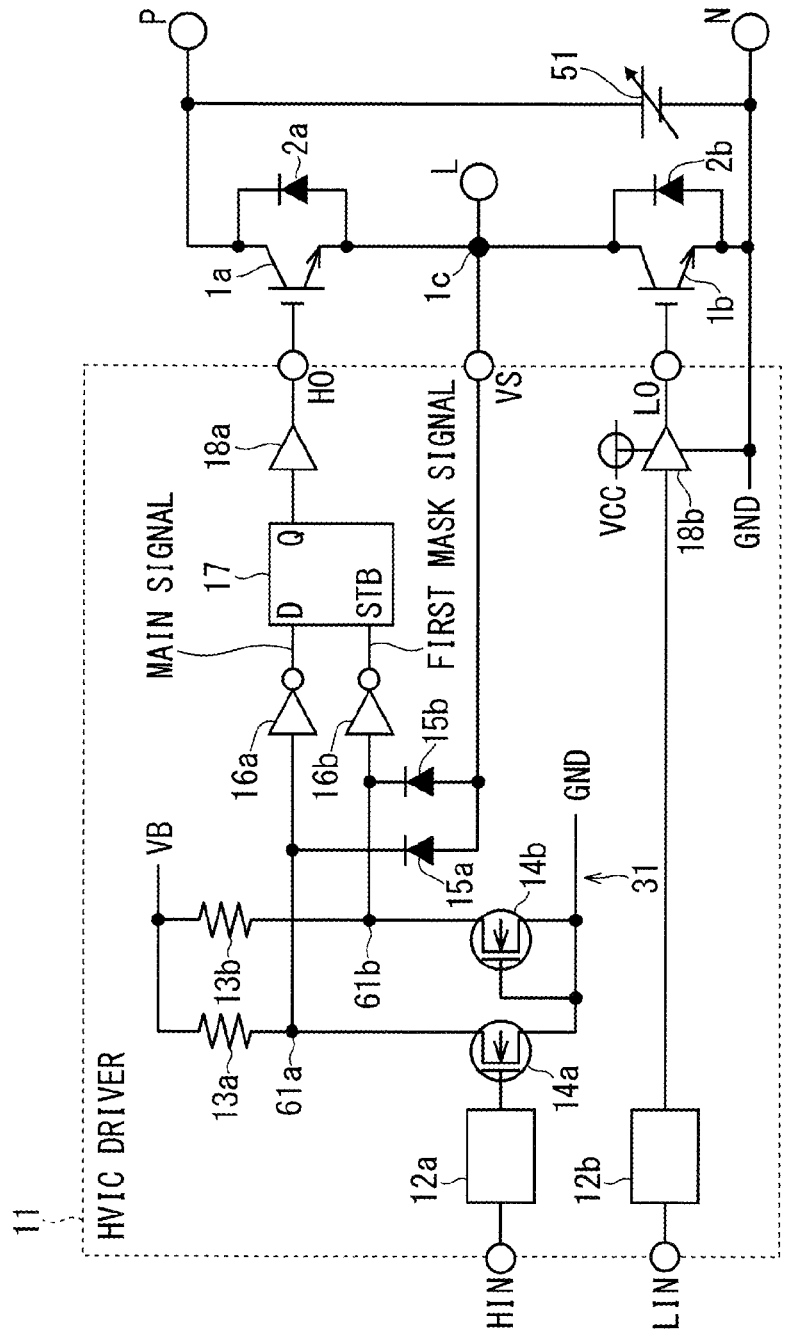

First, prior to explaining a semiconductor driving device and a semiconductor device including the semiconductor driving device according to a first preferred embodiment of the present invention, a semiconductor device related to these (hereinafter, referred to as "a related semiconductor device") will be described.

FIG. 1 is a circuit diagram showing a configuration of the related semiconductor device serving as an inverter control device. The related semiconductor device is configured to include a P-side switching (SW) element 1a connected to a P terminal of a high potential, a N-side switching (SW) element 1b connected to an N terminal of a low potential (ground potential), a P-side reflux diode 2a, an N-side reflux diode 2b, power supplies 51, 52, and 53, and an HVIC driver 11 having eight terminals (a VCC terminal, an HIN terminal, an LIN terminal, a GND terminal, a VB terminal, an HO terminal, a VS terminal, and an LO terminal).

The P-side SW element 1a (high-voltage side semiconductor switching element) and the N-side SW element 1b (low-voltage side semiconductor switching element) form an inverter and are connected in series between the P terminal and the N terminal. A gate terminal of the P-side SW element 1a is connected to the HO terminal of the HVIC driver 11, and a gate terminal of the N-side SW element 1b is connected to the LO terminal of the HVIC driver 11. A connection point 1c between the P-side SW element 1a and the N-side SW element 1b is connected to the VS terminal of the HVIC driver 11 and it is also connected to a load, which is not shown, through an L terminal.

Two ends of the P-side reflux diode 2a are connected to a source terminal and a drain terminal of the P-side SW element 1a, and two ends of the N-side reflux diode 2b are connected to a source terminal and a drain terminal of the N-side SW element 1b.

A positive electrode and a negative electrode of the power supply 51 are connected to the P terminal and the N terminal, respectively. The positive electrode and the negative electrode of the power supply 52 are connected to the VCC terminal and the GND terminal of the HVIC driver 11, respectively. The positive electrode and the negative electrode of the power supply 53 are connected to the VB terminal of the HVIC driver 11 and the VS terminal thereof, respectively.

In the related semiconductor device having the configuration as described above, the HVIC driver 11 controls a gate voltage of the P-side SW element 1a and a gate voltage of the N-side SW element 1b based on an input signal inputted into the HIN terminal and the LIN terminal to turn on and off the P-side SW element 1a and the N-side SW element 1b. In other words, the HVIC driver 11 serving as a semiconductor driving device can drive the P-side SW element 1a and the N-side SW element 1b.

The load, which is not shown, connected to the connection point 1c through the L terminal usually has an inductance, such as a coil. Thus, even if a driving control of the HVIC driver 11 switches the P-side SW element 1a from on to off, a current continuously flows from the connection point 1c to the load through the L terminal. For example, the current passing through the N terminal of the ground potential, the N-side reflux diode 2b, the connection point 1c, and the L terminal in this order continuously flows.

As a result, a negative surge in which a potential at the VS terminal (connection point 1c) is lower than the GND terminal (ground potential) by the amount of value obtained as a product of a stray inductance and dI/dt occurs (hereinafter, referred to as "a VS negative surge" in some cases). Moreover, the VS negative surge may occur except for the time in which the P-side SW element 1a is switched from on to off. The occurrence of the VS negative surge as described above is known for a cause of a malfunction in a circuit, and the VS negative surge may occur even in a case where the HVIC driver 11 is provided with a high-voltage level shifter circuit including a D latch circuit 17 which has been developed in recent times.

FIG. 2 is a circuit diagram showing an example of a configuration in which the HVIC driver 11 in FIG. 1 is provided with a level shifter circuit 31 (always-on level shifter circuit) including the D latch circuit 17.

An HVIC driver 11 as shown in FIG. 2 is configured to include always-on control circuits 12a and 12b, resistors 13a and 13b, high-voltage transistors 14a and 14b, diodes 15a and 15b, logic inversion elements 16a and 16b, the D latch circuit 17 having three terminals (a D terminal, a STB terminal, and a Q terminal), and buffer circuits 18a and 18b.

Among these, the always-on control circuit 12a, the resistors 13a and 13b, the high-voltage transistors 14a and 14b, the diodes 15a and 15b, the logic inversion elements 16a and 16b, the D latch circuit 17, and the buffer circuit 18a form the level shifter circuit 31 as mentioned above. A description about the reason will be omitted, and the level shifter circuit 31 can suppress a malfunction of an H latch and an L latch and reducing a circuit area even in a case where a pulse width is small and a time variation of the voltage is great.

Next, each structural component of the HVIC driver 11 will be described in detail.

The HIN terminal in which an input signal for mainly driving the P-side SW element 1a is inputted is connected to one end of the always-on control circuit 12a. The resistor 13a and the high-voltage transistor 14a are connected in series between the VB terminal and the GND terminal, and a gate terminal of the high-voltage transistor 14a is connected to the other end of the always-on control circuit 12a. The resistor 13a and the high-voltage transistor 14a are connected to a connection point 61a, and the connection point 61a is connected to the VS terminal through the diode 15a. Moreover, the connection point 61a is connected to the D terminal of the D latch circuit 17 through the logic inversion element 16a.

In the following descriptions, a signal outputted from the logic inversion element 16a is referred to as "a MAIN signal." The MAIN signal (second signal) is generated based on a potential (first potential) at the VS terminal (connection point 1c), a potential (predetermined second potential) at the VB terminal, and an input signal of the HIN terminal.

The resistor 13b and the high-voltage transistor 14b are connected in series between the VB terminal and the GND terminal, and a gate terminal of the high-voltage transistor 14b is connected to the GND terminal. The resistor 13b and the high-voltage transistor 14b are connected to a connection point 61b, and the connection point 61b is connected to the VS terminal through the diode 15b. Moreover, the connection point 61b is connected to the STB terminal of the D latch circuit 17 through the logic inversion element 16b.

In the following descriptions, a signal outputted from the logic inversion element 16b is referred to as "a first MASK signal." The first MASK signal is generated based on the potential (first potential) at the VS terminal (connection point 1c), the potential (predetermined second potential) at the VB terminal, and a potential (low potential) at the GND terminal.

Figure 3:
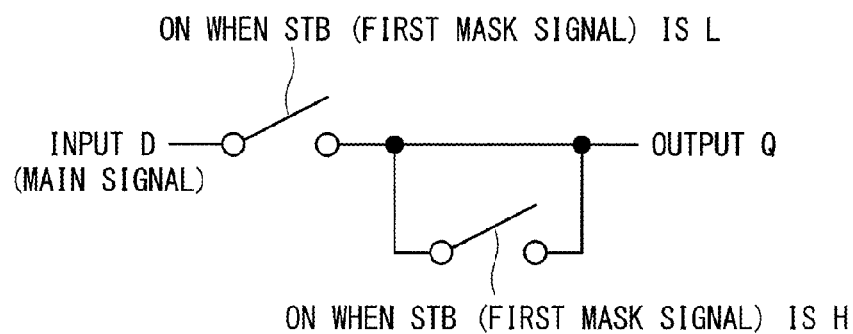
FIG. 3 is a circuit diagram showing an equivalent circuit of a D latch circuit.

FIG. 3 is a circuit diagram showing an equivalent circuit of the D latch circuit 17. The D latch circuit 17 generates a signal based on the first MASK signal inputted to the STB terminal and the MAIN signal inputted to the D terminal, and outputs the generated signal from the Q terminal. The D latch circuit 17 outputs an H signal from the Q terminal in a case where the first MASK signal=L (Low) and the MAIN signal=H (High). The D latch circuit 17 outputs an L signal from the Q terminal in a case where the first MASK signal=L and the MAIN signal=L. In other words, in a case where the first MASK signal=L, the D latch circuit 17 outputs, from the Q terminal, a signal having the same logic value as the MAIN signal. On the other hand, in a case where the first MASK signal=H, the D latch circuit 17 maintains a logic value (H or L) of the signal outputted from the Q terminal at the time of the first MASK signal=H until the first MASK signal=L.

Referring back to FIG. 2, the buffer circuit 18a is connected between the Q terminal of the D latch circuit 17 and the HO terminal.

The LIN terminal in which an input signal for mainly driving the N-side SW element 1b is inputted is connected to the always-on control circuit 12b. The buffer circuit 18b generates a signal based on a potential difference between the VCC terminal and the GND terminal and a signal from the always-on control circuit 12b (substantially, the input signal of the LIN terminal), and outputs the generated signal to the LO terminal. Since the potential difference between the VCC terminal and the GND terminal corresponds to the voltage of the power supply 52 as shown in FIG. 1, the power supply 52 (power supply) is used for the N-side SW element 1*b*.

Figure 4:
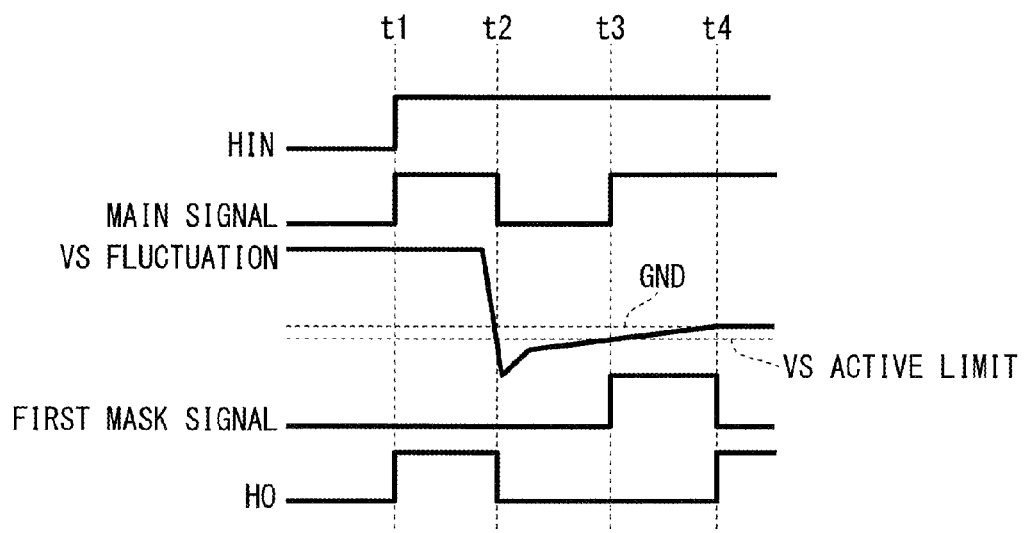
FIG. 4 is a timing chart showing an operation of the related semiconductor device.

In the related semiconductor device having the above-mentioned configuration, a mode that fails to output properly is generated in a case where the VS negative surge occurs. This will be described with reference to a timing chart of FIG. 4 showing an operation of the related semiconductor device. The mode that fails to output properly is generated in a period of t2 to t4 as shown in FIG. 4.

When describing from a time t1 in the order, first, the HIN terminal is switched from L to H at the time t1.

Next, the negative surge which makes a VS potential (potential at the VS terminal) negative occurs at about a time t2. Consequently, the first MASK signal is not inverted, and a signal generated to a level-shifting resistance, the MAIN signal, and the like are inverted, resulting in an inversion of an HO potential (potential at the HO terminal) from H to L. In other words, even if an HIN potential (potential at the HIN terminal) is H from about the time t2 at which the negative surge occurs to a time t3 at which the VS potential is the active limit, the HO potential is inverted to L.

At the time t3, the MAIN signal is switched from L to H and the first MASK signal is switched from L to H, and it is conceivable that the first MASK signal may be switched before the MAIN signal is switched for some reasons. In such a case, due to the operation of the D latch circuit 17 described with reference to FIG. 3, it is conceivable that the output from the HO terminal is maintained as L instead of being switched to H after the time t3 at which the MAIN signal is switched to H. In this case, the output from the HO terminal is unstable until the time when the VS potential becomes positive (time t4).

In contrast, an HVIC driver 11 and a semiconductor device according to a first preferred embodiment of the present invention can solve the problems. Next, the HVIC driver 11 and the semiconductor device according to the first preferred embodiment will be described.

First Preferred Embodiment

Figure 5:
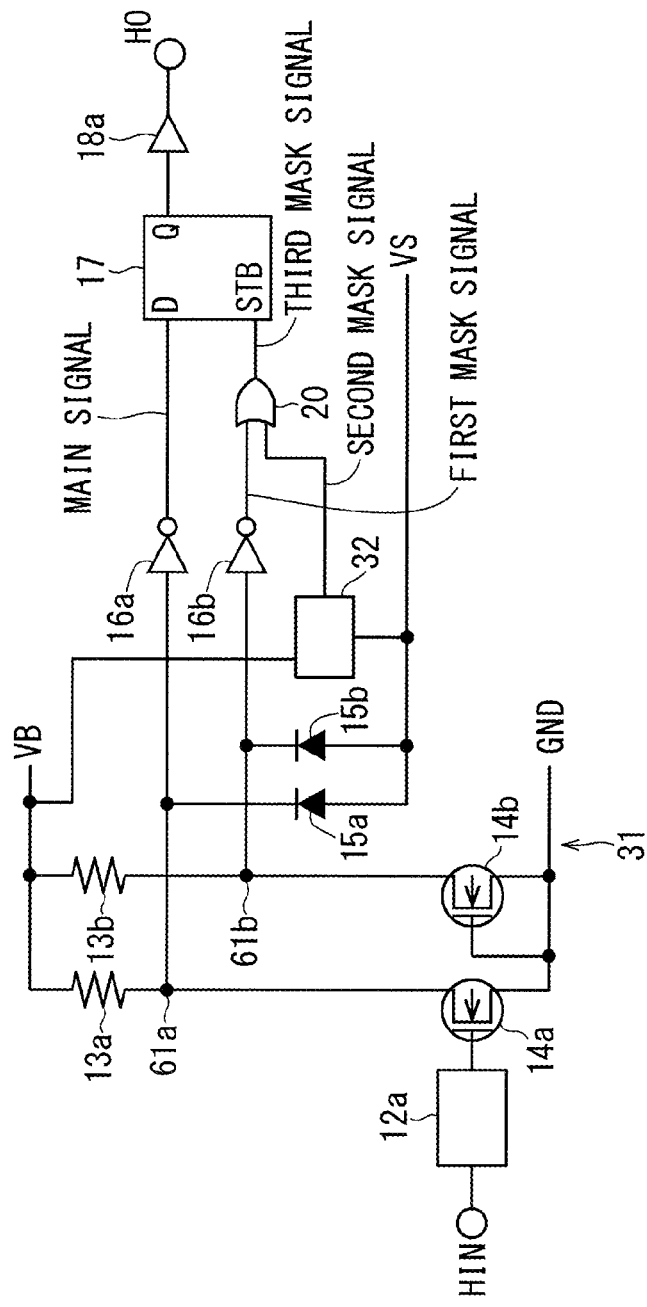
FIG. 5 is a circuit diagram showing a configuration of an HVIC driver according to a first preferred embodiment.
Figure 6:
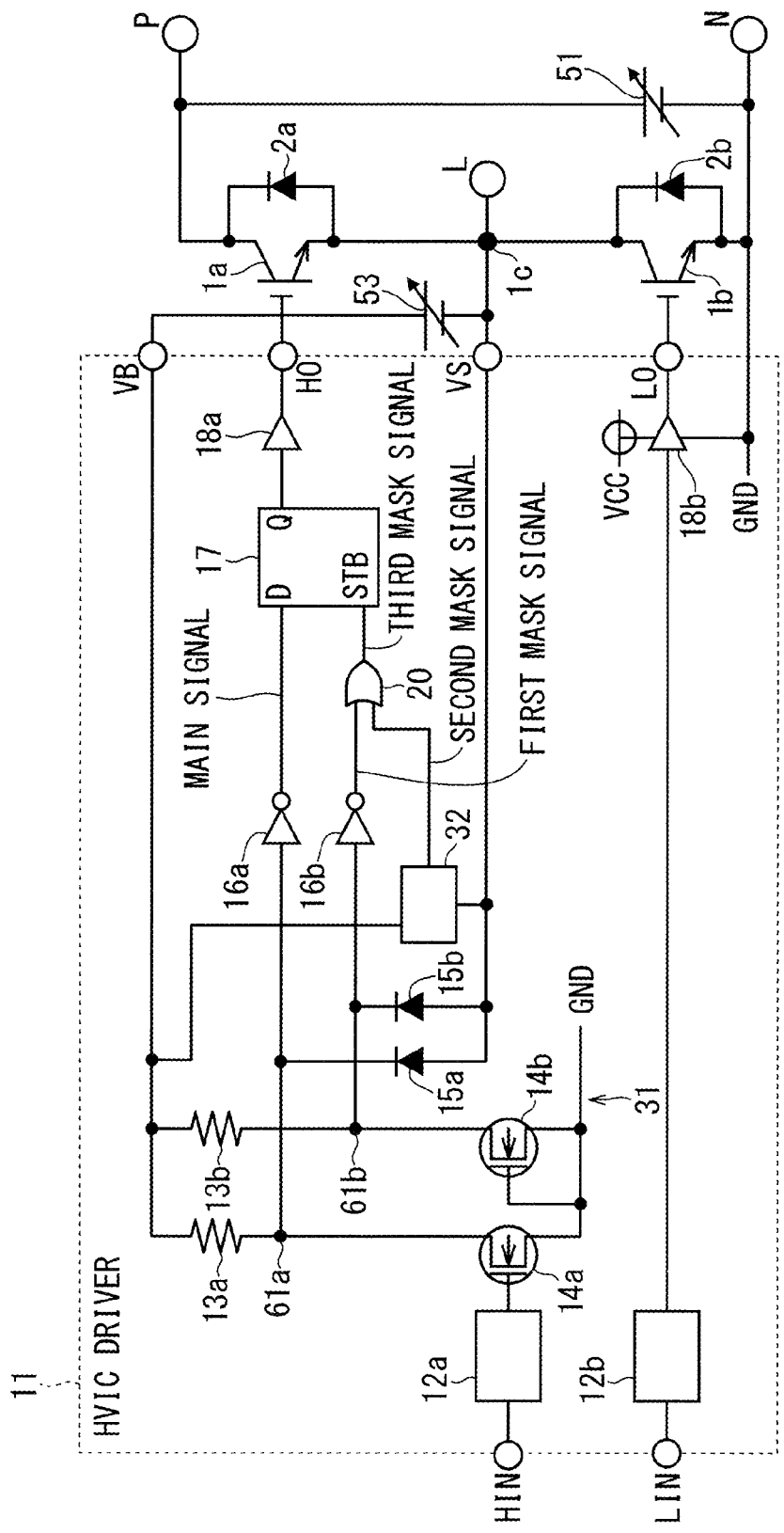
FIG. 6 is a circuit diagram showing a configuration of a semiconductor device according to the first preferred embodiment.

FIG. 5 is a circuit diagram showing a part of a configuration of an HVIC driver 11 according to a first preferred embodiment. FIG. 6 is a circuit diagram showing a configuration of a semiconductor device according to the first preferred embodiment including the HVIC driver 11. In the first preferred embodiment, the same or similar structural components as those described in the related semiconductor device are denoted by the same references, and differences will be mainly described below.

The HVIC driver 11 as shown in FIGS. 5 and 6 is configured to further include a logical sum element 20 and a negative surge detection circuit 32 in addition to the structural components of the HVIC driver 11 shown in FIG. 2.

The negative surge detection circuit 32 detects whether the negative surge occurs at the VS terminal, namely, the connection point 1*c* shown in FIG. 2. The negative surge detection circuit 32 compares the VS potential and a VB potential (potential at the VB terminal). In a case where the VS potential is lower than the VB potential, the negative surge detection circuit 32 detects that the VS negative surge does not occur, and outputs a detection signal (L signal) indicating the detection result to the logical sum element 20. On the other hand, in a case where the VS potential is greater than the VB potential, the negative surge detection circuit 32 detects that the VS negative surge occurs, and outputs a detection signal (H signal) indicating the detection result to the logical sum element 20. Hereinafter, the detection signal outputted from the negative surge detection circuit 32 is referred to as "a second MASK signal."

The logical sum element 20 forms a level shifter circuit 31 according to the first preferred embodiment with the always-on control circuit 12*a*, the resistors 13*a* and 13*b*, the high-voltage transistors 14*a* and 14*b*, the diodes 15*a* and 15*b*, the logic inversion elements 16*a* and 16*b*, the D latch circuit 17, and the buffer circuit 18*a*.

The logical sum element 20 outputs a signal indicating a logical sum of the first MASK signal outputted from the logic inversion element 16*a* and the second MASK signal outputted from the negative surge detection circuit 32. The output from the logical sum element 20 is inputted to the STB terminal of the D latch circuit 17.

Hereinafter, a signal outputted from the logical sum element 20 is referred to as "a third MASK signal." The first MASK signal is generated based on the potential at the VS terminal, the potential at the VB terminal, and the potential at the GND terminal. On the other hand, the second MASK signal corresponds to a detection result of the negative surge detection circuit 32. Therefore, the third MASK signal (first signal) generated based on the first MASK signal and the second MASK signal is generated based on the potential (first potential) at the VS terminal (connection point 1*c*), the potential at the VB terminal (predetermined second potential), the potential (low potential) at the GND terminal, and the detection result of the negative surge detection circuit 32.

The D latch circuit 17 generates a signal based on the third MASK signal inputted to the STB terminal and the MAIN signal inputted to the D terminal, and outputs the generated signal from the Q terminal. In other words, in a case where the third MASK signal=L, the D latch circuit 17 outputs a signal having the same logic value as the MAIN signal from the Q terminal. On the other hand, in a case where the third MASK signal=H, the D latch circuit 17 maintains a logic value (H or L) of the signal outputted from the Q terminal at the time when the third MASK signal=H until the third MASK signal=L.

The level shifter circuit 31 level-shifts the MAIN signal correspondingly to the third MASK signal as described above. Thus, the level shifter circuit 31 can maintain a driving voltage used in driving the P-side SW element 1*a* upon the negative surge detection circuit 32 detecting occurrence of the VS negative surge. Next, this will be described in detail.

<Operation>

Figure 7:
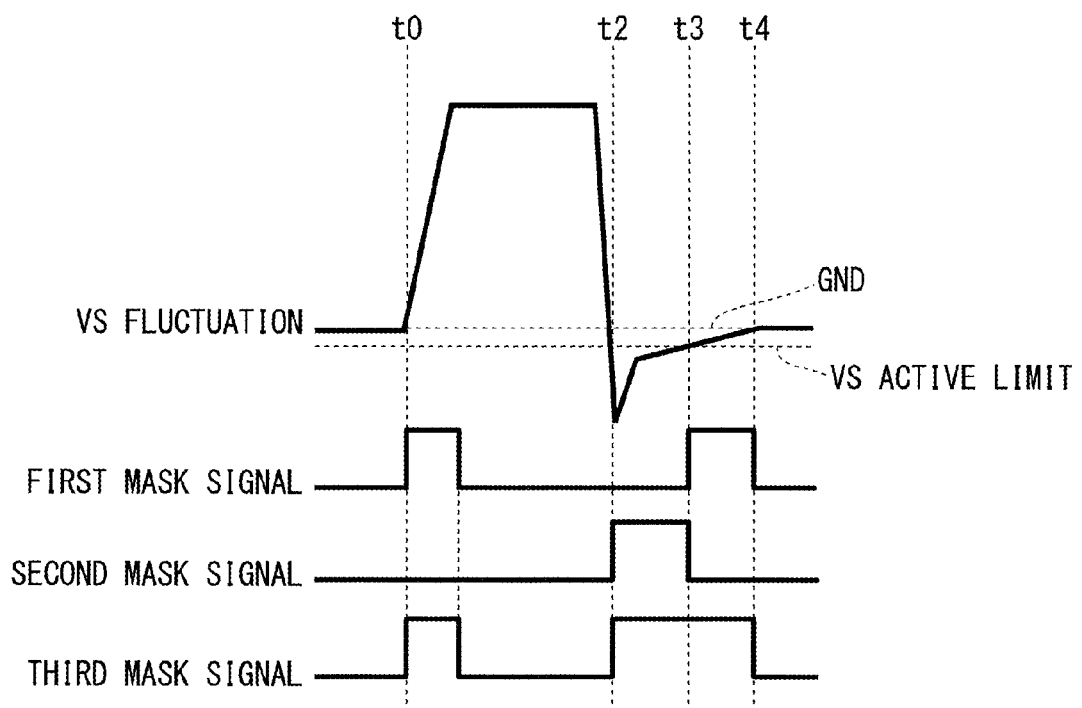
FIG. 7 is a timing chart showing an operation of the semiconductor device according to the first preferred embodiment.

FIG. 7 is a timing chart showing an operation of the semiconductor device according to the first preferred embodiment. In the semiconductor device according to the first preferred embodiment similarly to the related semiconductor device, in a case where the VS potential is greater than the VS active limit and the VS potential shifts in a positive direction (dV/dt is positive), the signal being H is inputted to the STB terminal of the D latch circuit 17. In addition to this, in the semiconductor device according to the first preferred embodiment, even in a case where the VS potential shifts in a negative direction (dV/dt is negative) and the VS negative surge occurs, the signal being H is inputted to the STB terminal of the D latch circuit 17. Next, the operation of the semiconductor device according to the first preferred embodiment will be described in detail. Times t2, t3, and t4 in FIG. 7 correspond to the times t2, t3, and t4 in FIG. 4.

Under normal conditions, the third MASK signal is L. Thus, switching the high-voltage transistor 14*a* between on and off switches the MAIN signal between H and L. Accordingly, the output from the HO terminal is switched between H and L. In other words, the HO output logic is determined and stabilized.

In a case where the VS potential shifts from a GND potential (potential at the GND terminal) to a high voltage (in a case where dV/dt is positive), a displacement current flows to the GND terminal from the VB terminal. The high-voltage transistor 14b turns on when detecting generation of the displacement current, so that the first MASK signal is switched from L to H and the third MASK signal is switched from L to H at the time t0. The third MASK signal being H is inputted to the STB terminal, and the D latch circuit 17 is logically fixed. In other words, the D latch circuit 17 maintains the logic value of the signal outputted from the Q terminal at that time. Thus, before the shift of the VS terminal to the high voltage has an effect on the MAIN signal, the logic value (potential) at the HO terminal can be fixed.

On the other hand, when the VS potential shifts in the negative direction (dV/dt is negative) and the VS negative surge occurs at about the time t2, the VS potential is lower than the GND potential. Accordingly, the VB potential connected to the VS terminal through the power supply 53 (FIG. 6) is also lower than the GND potential, namely, a drain potential (potential at a drain terminal) of the high-voltage transistor 14b. Thus, the order of source/drain potentials of the high-voltage transistor 14b, namely, high and low of the potential is reversed, whereby a current flows to the VB terminal from the GND terminal. As a result, the VS potential is higher than the VB potential by the product of a current value of the current and a resistance value of the resistor 13b.

In other words, the VS potential is lower than the VB potential under normal conditions, and the VS potential is higher than the VB potential upon the occurrence of the VS negative surge. The negative surge detection circuit 32 is configured to detect whether the VS negative surge occurs based on the reversion of order of the potentials at the VS terminal and the VB terminal.

The negative surge detection circuit 32 detects the occurrence of the VS negative surge, and outputs the second MASK signal being H shown as the time t2 in FIG. 7 to the logical sum element 20 of the level shifter circuit 31. Accordingly, the third MASK signal is switched from L to H. When the third MASK signal being H is inputted to the STB terminal, the D latch circuit 17 is logically fixed, and the logic value (potential) at the HO terminal is fixed.

In other words, in the related semiconductor device, the logic value (potential) at the HO terminal is fixed at the time t3 in FIG. 4, and in the first preferred embodiment, the logic value (potential) at the HO terminal can be fixed at the time t2 in FIG. 4 in which the VS negative surge occurs. Therefore, before the VS negative surge has an effect on the MAIN signal (before the MAIN signal is switched from H to L at the time t2 in FIG. 4), the logic value (potential) at the HO terminal can be fixed, suppressing the HO potential to be inverted to L at the time t2. Moreover, the third MASK signal being H is maintained from the time t2 to the time t4, and the logic value (potential) at the HO terminal is fixed during the period, so that the output from the HO terminal is stable from the time t3 to the time t4.

In the semiconductor driving device (HVIC driver 11) and the semiconductor device according to the first preferred embodiment as described above, in a case where the negative surge detection circuit 32 detects the occurrence of the VS negative surge, the driving voltage used in driving the P-side SW element 1a is maintained. Thus, before the occurrence of the VS negative surge has an effect on the MAIN signal, the voltage of the HO terminal used in driving the P-side SW element 1a can be maintained. Therefore, the inversion of the HO potential and output instability of the HO terminal occurred in the related semiconductor device can be suppressed. In other words, according to the first preferred embodiment, the adverse effect of the VS negative surge can be suppressed in the always-on level shifter circuit including, for example, the D latch circuit 17.

As described above, the negative surge detection circuit 32 compares the VB potential and the VS potential, and detects whether the VS negative surge occurs based on the result of the comparison, but it is not limited to this. For example, as a configuration of a second preferred embodiment or subsequent embodiments described next, the negative surge detection circuit 32 may compare the VS potential and a drain potential of the high-voltage transistor 14b (GND potential, a potential at the connection point 61b) and detect whether the VS negative surge occurs based on the result of the comparison.

Second Preferred Embodiment

Figure 8:
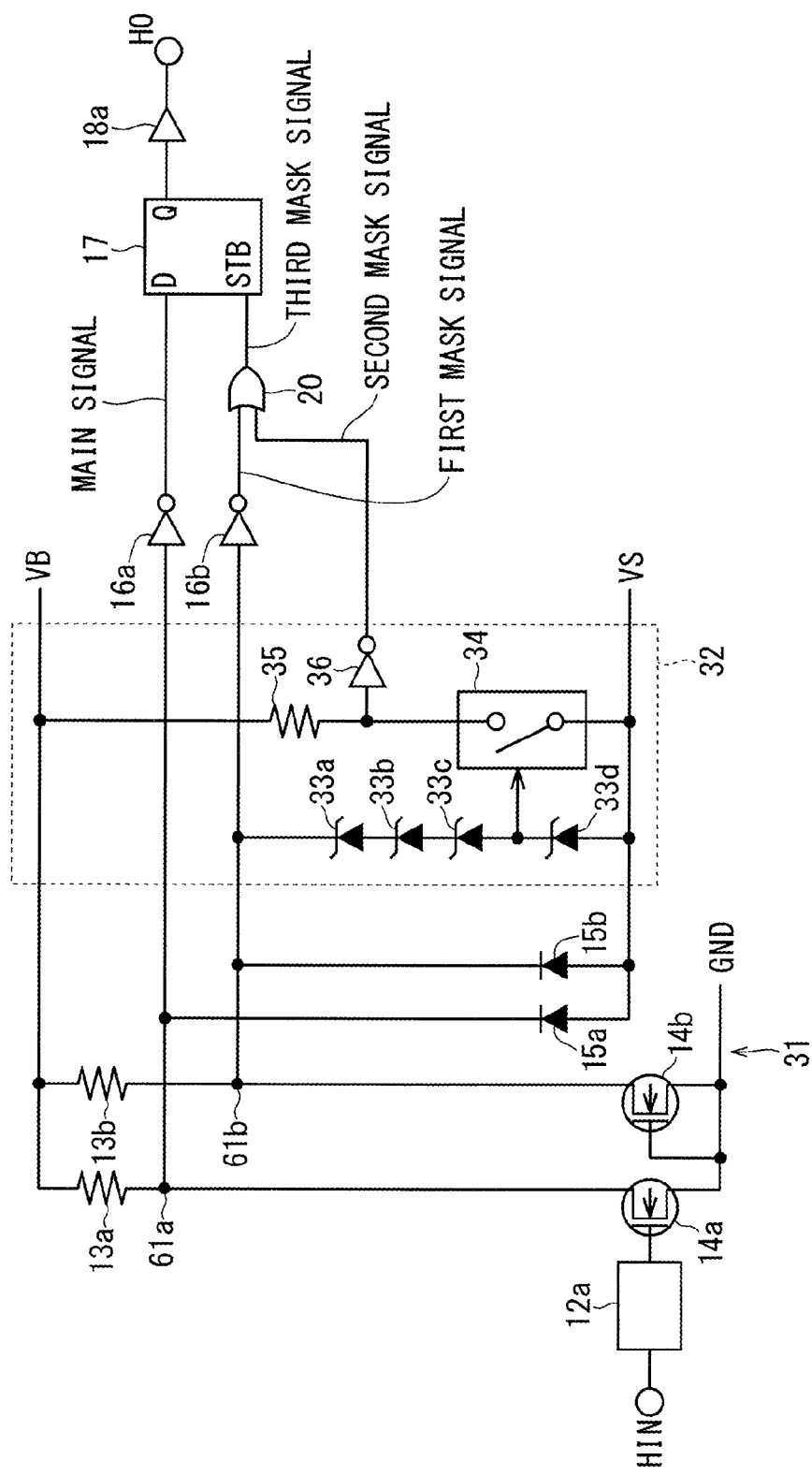
FIG. 8 is a circuit diagram showing a configuration of an HVIC driver according to a second preferred embodiment.

FIG. 8 is a circuit diagram showing a part of a configuration of an HVIC driver 11 according to a second preferred embodiment of the present invention. In the second preferred embodiment, the same or similar structural components as those described in the first preferred embodiment are denoted by the same references, and differences will be mainly described below.

A negative surge detection circuit 32 according to the second preferred embodiment is configured to include a plurality of zener diodes 33a, 33b, 33c, and 33d (herein, four), a switching circuit 34, a resistor 35, and a logic inversion element 36.

Four zener diodes 33a to 33d are connected in series between the connection point 61b and the VS terminal. The potential between the zener diode 33c (first zener diode) and the zener diode 33d (second zener diode) is inputted to the switching circuit 34. The zener diodes 33a to 33d each have a breakdown voltage of Vz, and in a case where the VS negative surge occurs, the potential between the zener diode 33c and the zener diode 33d is 3×Vz (predetermined potential).

The switching circuit 34 and the resistor 35 are connected between the VB terminal and the VS terminal. The switching circuit 34 is configured to turn on when the potential between the zener diode 33c and the zener diode 33d is 3×Vz (predetermined potential).

In the configuration as described above, in a case where the VS negative surge voltage occurs, the GND potential is considerably greater than the VS potential. Consequently, when the VS negative surge voltage occurs, a voltage Vd between the drain potential of the high-voltage transistor 14b and the VS potential is considerably great, and the potential between the zener diode 33c and the zener diode 33d is clamped by 3×Vz. The switching circuit 34 turns on when the potential between the zener diode 33c and the zener diode 33d is 3×Vz (in other words, in a case where the VS negative surge occurs). Then, the switching circuit 34 generates an inversion signal of the signal obtained from the voltage distributed by the ratio between the resistor 35 and an on-resistance of the switching circuit 34 as a detection signal (second MASK signal being H) indicating the occurrence of the VS negative surge.

In other words, under normal conditions (in a case where the VS negative surge does not occur), the VS potential is approximately equal to the GND potential, whereby the voltage Vd even at the maximum does not exceed the voltage between VB and VS in normal times. In this case, the switching circuit 34 does not turn on, so that no detection signal (second MASK signal being H) indicating the occurrence of the VS negative surge is outputted to the STB terminal of the D latch circuit 17.

On the other hand, when the VS negative surge occurs and the voltage Vd is to be 4×Vz or greater, the potential between the zener diode 33c and the zener diode 33d has 3×Vz. In this case, the switching circuit 34 turns on, so that the detection signal (second MASK signal being H) indicating the occurrence of the VS negative surge is generated, and the generated detection signal is outputted to the STB terminal of the D latch circuit 17.

In the semiconductor driving device (HVIC driver 11) and the semiconductor device according to the second preferred embodiment as described above, the zener diodes 33a to 33d are appropriately selected, and thus the potential to turn on the switching circuit 34 can be easily set to the desirable potential.

Third Preferred Embodiment

Figure 9:
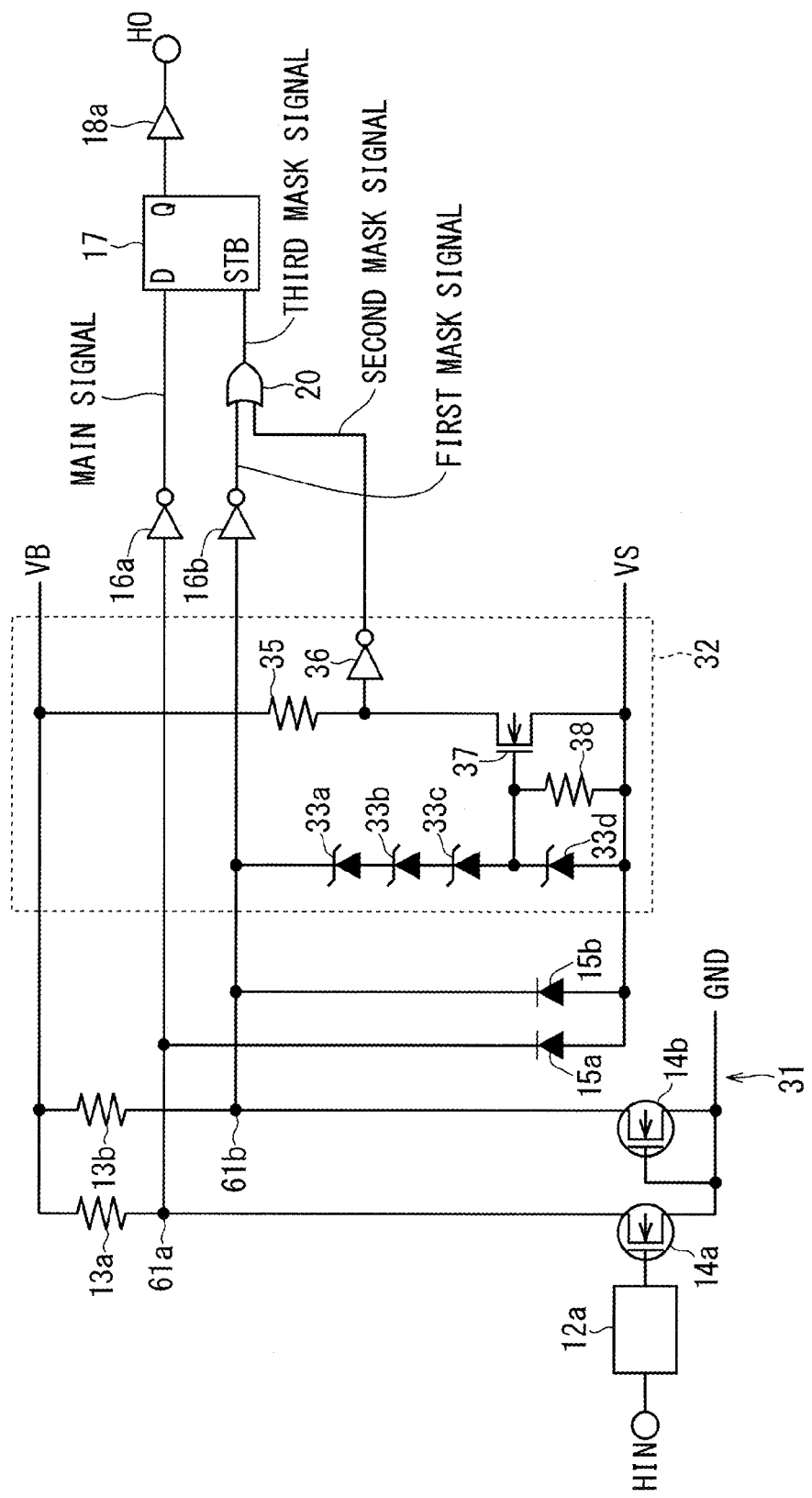
FIG. 9 is a circuit diagram showing a configuration of an HVIC driver according to a third preferred embodiment.

FIG. 9 is a circuit diagram showing a part of a configuration of an HVIC driver 11 according to a third preferred embodiment of the present invention. In the third preferred embodiment, the same or similar structural components as those described in the second preferred embodiment are denoted by the same references, and differences will be mainly described below.

In the third preferred embodiment, an N-type metal-oxide-semiconductor field-effect transistor (MOSFET) 37 and a resistor 38 connected between a gate terminal of the N-type MOSFET 37 and the VS terminal are used as the switching circuit 34 in FIG. 8.

The N-type MOSFET 37 turns on in a case where a potential between the zener diode 33c and the zener diode 33d has 3×Vz (in other words, in a case where the VS negative surge occurs). Moreover, when the N-type MOSFET 37 turns on, the N-type MOSFET 37 similarly to the switching circuit 34 as mentioned above, generates an inversion signal of the signal obtained from the voltage distributed by the ratio between the resistor 35 and the on-resistance of the switching circuit 34 as a detection signal (second MASK signal being H) indicating that the VS negative surge occurs.

In the semiconductor driving device (HVIC driver 11) and the semiconductor device according to the third preferred embodiment as described above, the inversion signal of the signal obtained from the voltage distributed by the ratio between the resistor 35 and the on-resistance of the N-type MOSFET 37 can be inputted, as the detection signal indicating that the VS negative surge occurs, to an inverter element of the next stage. Consequently, the stable transmission of a signal can be achieved and a circuit can be compact in size. Under normal conditions, the N-type MOSFET 37 turns off, whereby current consumption can be reduced.

Fourth Preferred Embodiment

Figure 10:
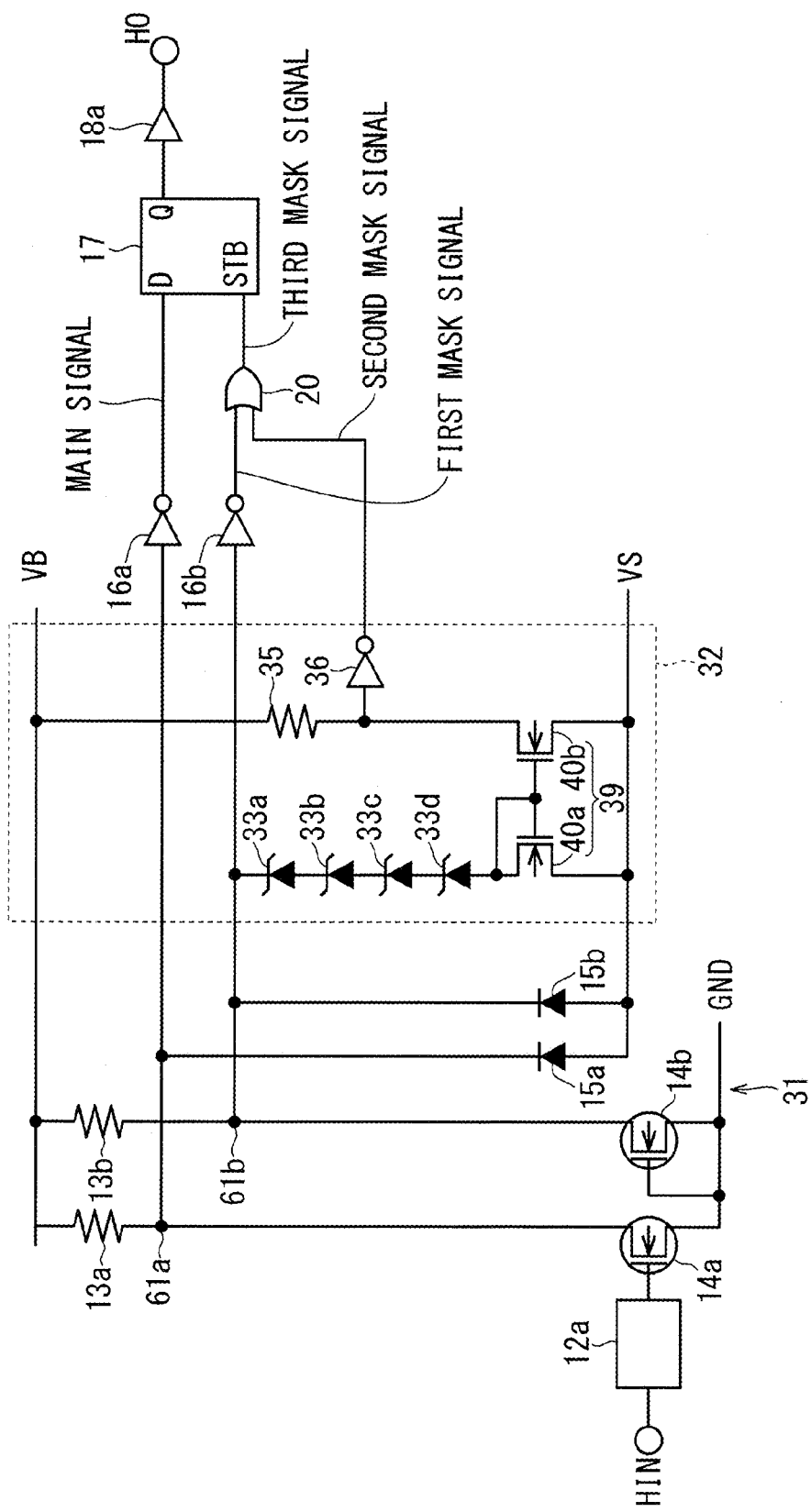
FIG. 10 is a circuit diagram showing a configuration of an HVIC driver according to a fourth preferred embodiment.

FIG. 10 is a circuit diagram showing a part of a configuration of an HVIC driver 11 according to a fourth preferred embodiment of the present invention. In the fourth preferred embodiment, the same or similar structural components as those described in the second preferred embodiment are denoted by the same references, and differences will be mainly described below.

A negative surge detection circuit 32 according to the fourth preferred embodiment is configured to include a current mirror circuit 39 instead of the switching circuit 34 in FIG. 8. The current mirror circuit 39 is configured to include two N-type MOSFETs 40a and 40b. The N-type MOSFET 40a is connected between the zener diode 33d and the VS terminal, and the N-type MOSFET 40b is connected between the resistor 35 and the VS terminal. Moreover, a gate terminal of the N-type MOSFET 40a and a gate terminal of the N-type MOSFET 40b are connected to each other, and the gate terminals are connected to a connection point between the N-type MOSFET 40a and the zener diode 33d.

In the configuration as described above, when the VS negative surge occurs, a current flows through the zener diodes 33a to 33d. The current mirror circuit 39 turns on in a case of detecting the current flowing through the zener diodes 33a to 33d, and the current mirror circuit 39 generates the inversion signal of the signal obtained from the voltage distributed by the ratio between the resistor 35 and the on-resistance of the switching circuit 34 as the detection signal (second MASK signal being H) indicating that the VS negative surge occurs. In other words, a circuit for transmitting a current signal to a later stage is achieved.

In the semiconductor driving device (HVIC driver 11) and the semiconductor device according to the fourth preferred embodiment as described above, the negative surge detection circuit 32 is configured to include the current mirror circuit 39 that performs a current mirror operation, and thus a mirror ratio and the resistor 35 for converting a voltage of the following stage are properly designed, whereby a desirable detection sensitivity can be easily achieved.

Fifth Preferred Embodiment

Figure 11:
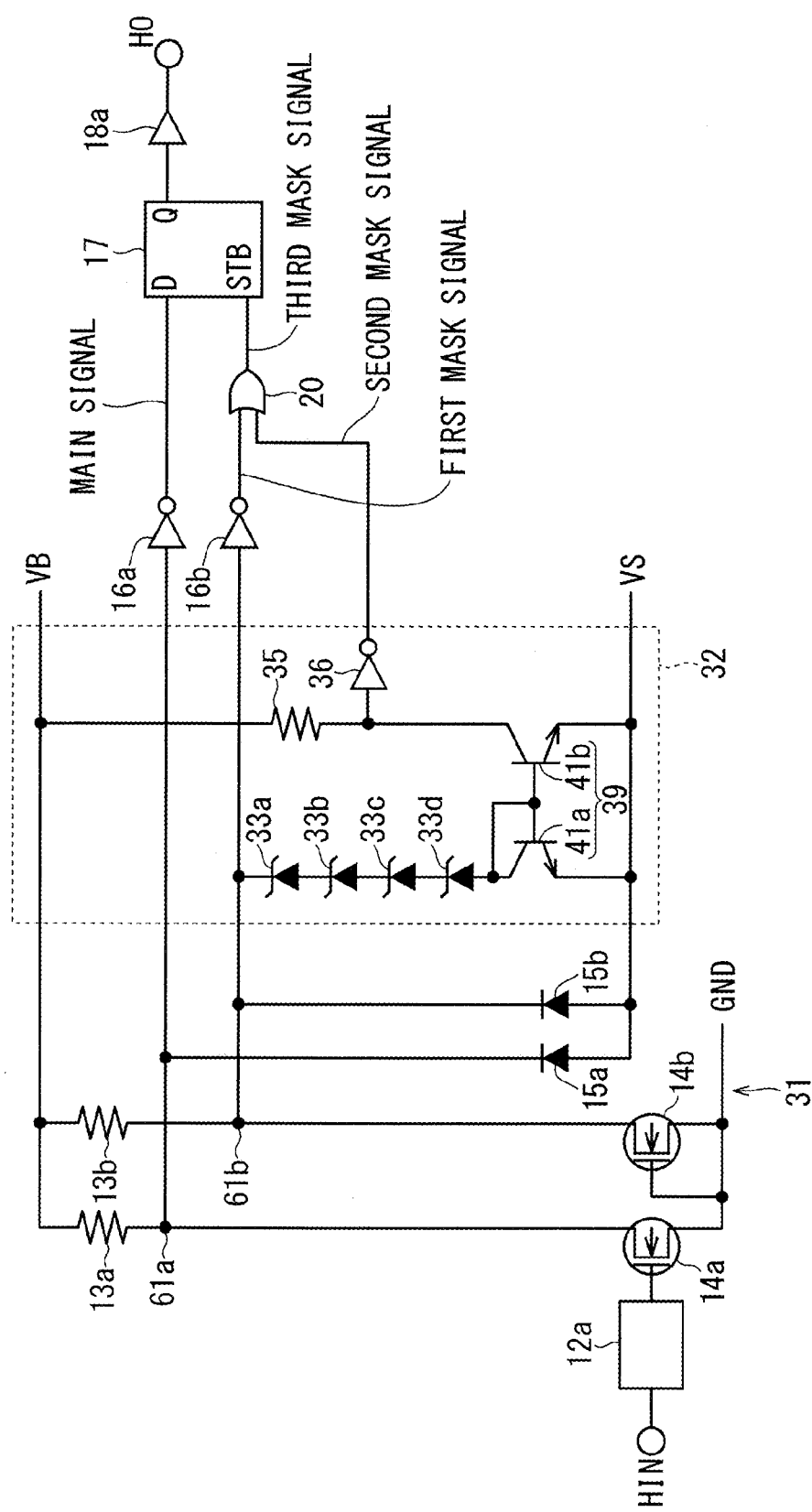
FIG. 11 is a circuit diagram showing a configuration of an HVIC driver according to a fifth preferred embodiment.

FIG. 11 is a circuit diagram showing a part of a configuration of an HVIC driver 11 according to a fifth preferred embodiment of the present invention. In the fifth preferred embodiment, the same or similar structural components as those described in the fourth preferred embodiment are denoted by the same references, and differences will be mainly described below.

The semiconductor driving device (HVIC driver 11) and the semiconductor device according to the fifth preferred embodiment is configured to include the current mirror circuit 39 similarly to the fourth preferred embodiment, so that the fifth preferred embodiment can obtain a similar effect to that in the fourth preferred embodiment. Moreover, the current mirror circuit 39 is configured to include two bipolar transistors 41a and 41b instead of two N-type MOSFETs 40a and 40b, and thus an effect on the clamp voltage by the zener diodes 33a to 33d can be uniformly fixed to a forward voltage VF. Therefore, voltage fluctuation in current can be suppressed.

Sixth Preferred Embodiment

Figure 12:
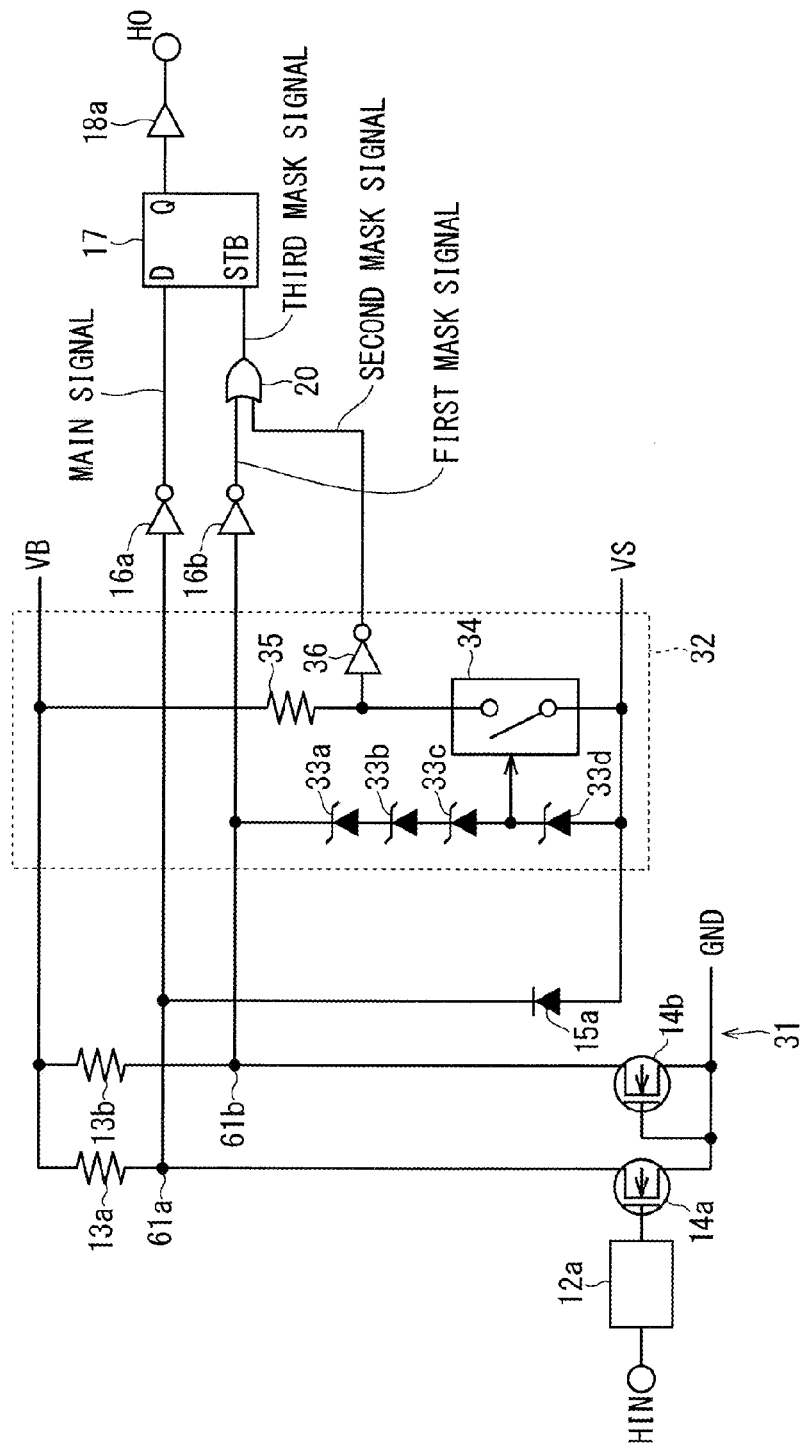
FIG. 12 is a circuit diagram showing a configuration of an HVIC driver according to a sixth preferred embodiment.

FIG. 12 is a circuit diagram showing a part of a configuration of an HVIC driver 11 according to a sixth preferred embodiment of the present invention. In the sixth preferred embodiment, the same or similar structural components as those described in the second preferred embodiment are denoted by the same references, and differences will be mainly described below.

In the sixth preferred embodiment, a plurality of zener diodes 33a to 33d have the function of the diode 15b in FIG. 8, so that the diode 15b is omitted. The number of stages of the zener diodes having the breakdown voltage Vz less than the clamp voltage on the MAIN signal side are properly designed, whereby the clamp voltage on the third MASK signal side can be set to a desirable voltage. Therefore, sensitivity of the third MASK signal to fluctuation in the VS potential can be enhanced than sensitivity of the MAIN signal. In other words, difference in the sensitivity between the MAIN signal and the third MASK signal can be easily set to a desirable voltage, and thus a stable operation can be expected upon the fluctuation in the VS potential.

Seventh Preferred Embodiment

Figure 13:
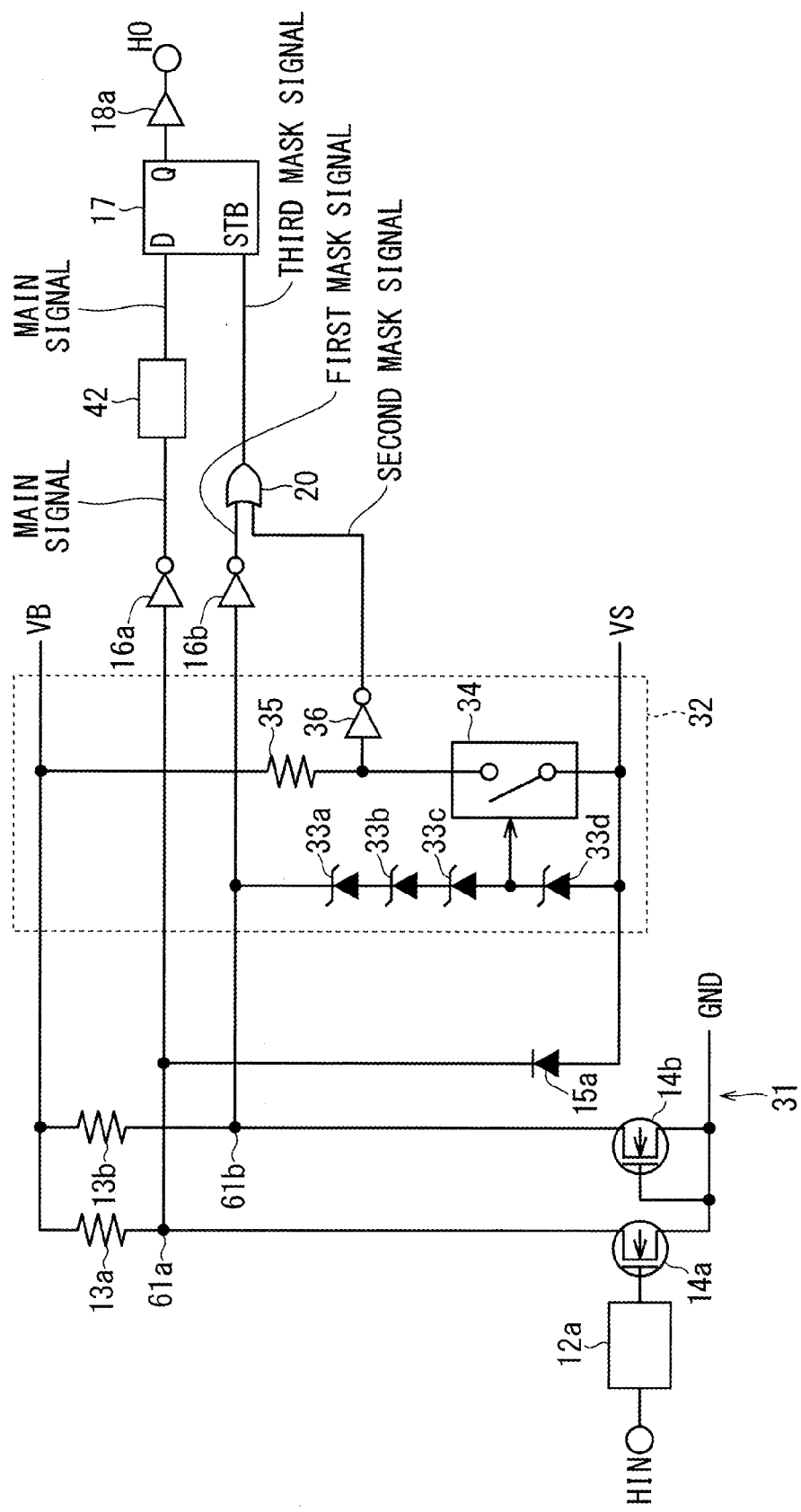
FIG. 13 is a circuit diagram showing a configuration of an HVIC driver according to a seventh preferred embodiment.

FIG. 13 is a circuit diagram showing a part of a configuration of an HVIC driver 11 according to a seventh preferred embodiment of the present invention. In the seventh preferred embodiment, the same or similar structural components as those described in the sixth preferred embodiment are denoted by the same references, and differences will be mainly described below.

The HVIC driver 11 according to the seventh preferred embodiment is configured to further include a delay circuit 42 in addition to the structural components of the HVIC driver 11 as shown in FIG. 12. The delay circuit 42 delays the MAIN signal which is level-shifted by the shifter circuit 31 with respect to the third MASK signal used for level-shifting the MAIN signal.

FIG. 14 is a timing chart showing an operation of a semiconductor device according to the seventh preferred embodiment. Upon the occurrence of the VS negative surge, the timing at which the MAIN signal before being inputted to the delay circuit 42 (namely, the output signal from the logic inversion element 16a) is switched from H to L is approximately equal to the timing at which the third MASK is switched from L to H. When the MAIN signal is inputted to the D terminal of the D latch circuit 17, it is conceivable that the timing at which the MAIN signal is switched from H to L may precede the timing at which the third MASK is switched from L to H for some reasons. In this case, the D latch circuit 17 maintains the MAIN signal affected by the occurrence of the VS negative surge as the output signal.

In the seventh preferred embodiment, the MAIN signal after being inputted to the delay circuit 42 is configured to be inputted to the D latch circuit 17. Thus, before the occurrence of the VS negative surge has an effect on the MAIN signal, the logic value (potential) at the HO terminal can be fixed with reliability. In other words, the timing of switching the D latch circuit 17 can be forcibly arranged in order, so that in the always-on level shifter circuit including, for example, the D latch circuit 17, an adverse effect by the VS negative surge can be suppressed with reliability.

Eighth Preferred Embodiment

Figure 15:
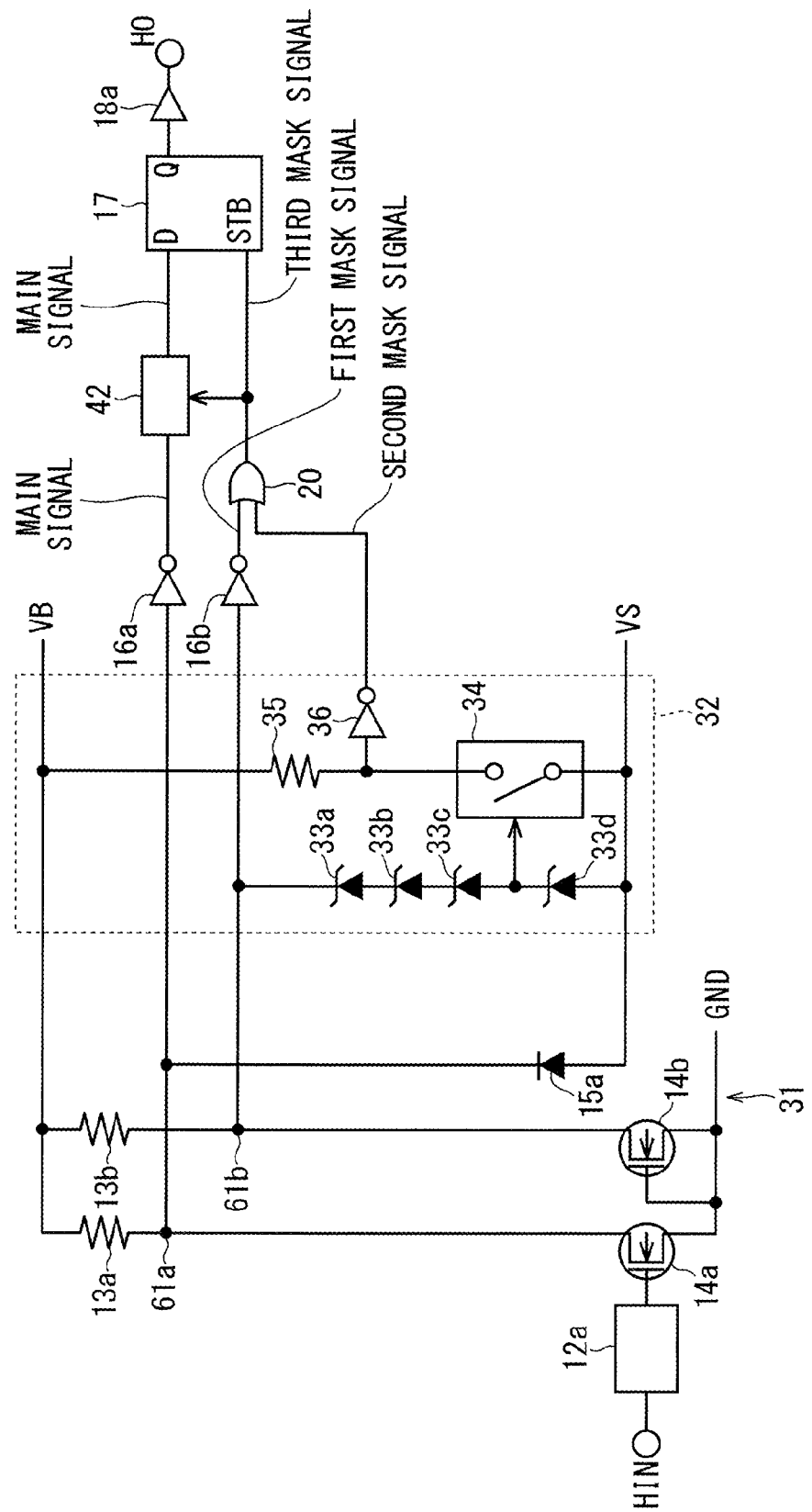
FIG. 15 is a circuit diagram showing a configuration of an HVIC driver according to an eighth preferred embodiment.

FIG. 15 is a circuit diagram showing a part of a configuration of an HVIC driver 11 according to an eighth preferred embodiment of the present invention. In the eighth preferred embodiment, the same or similar structural components as those described in the seventh preferred embodiment are denoted by the same references, and differences will be mainly described below.

In the eighth preferred embodiment, the third MASK signal is inputted to a delay circuit 42. The delay circuit 42 determines whether the negative surge detection circuit 32 detects the occurrence of the VS negative surge based on the third MASK signal and the like. In a case where the delay circuit 42 determines that the occurrence of the VS negative surge is detected, the delay circuit 42 delays the MAIN signal. In other words, the delay circuit 42 according to the eighth preferred embodiment delays the MAIN signal only upon the negative surge detection circuit 32 detecting the occurrence of the VS negative surge.

In the semiconductor driving device (HVIC driver 11) and the semiconductor device according to the eighth preferred embodiment as described above, the delay circuit 42 can be suppressed to delay the output (MAIN signal) under normal conditions (in a case where the VS negative surge does not occur).

Ninth Preferred Embodiment

Figure 16:
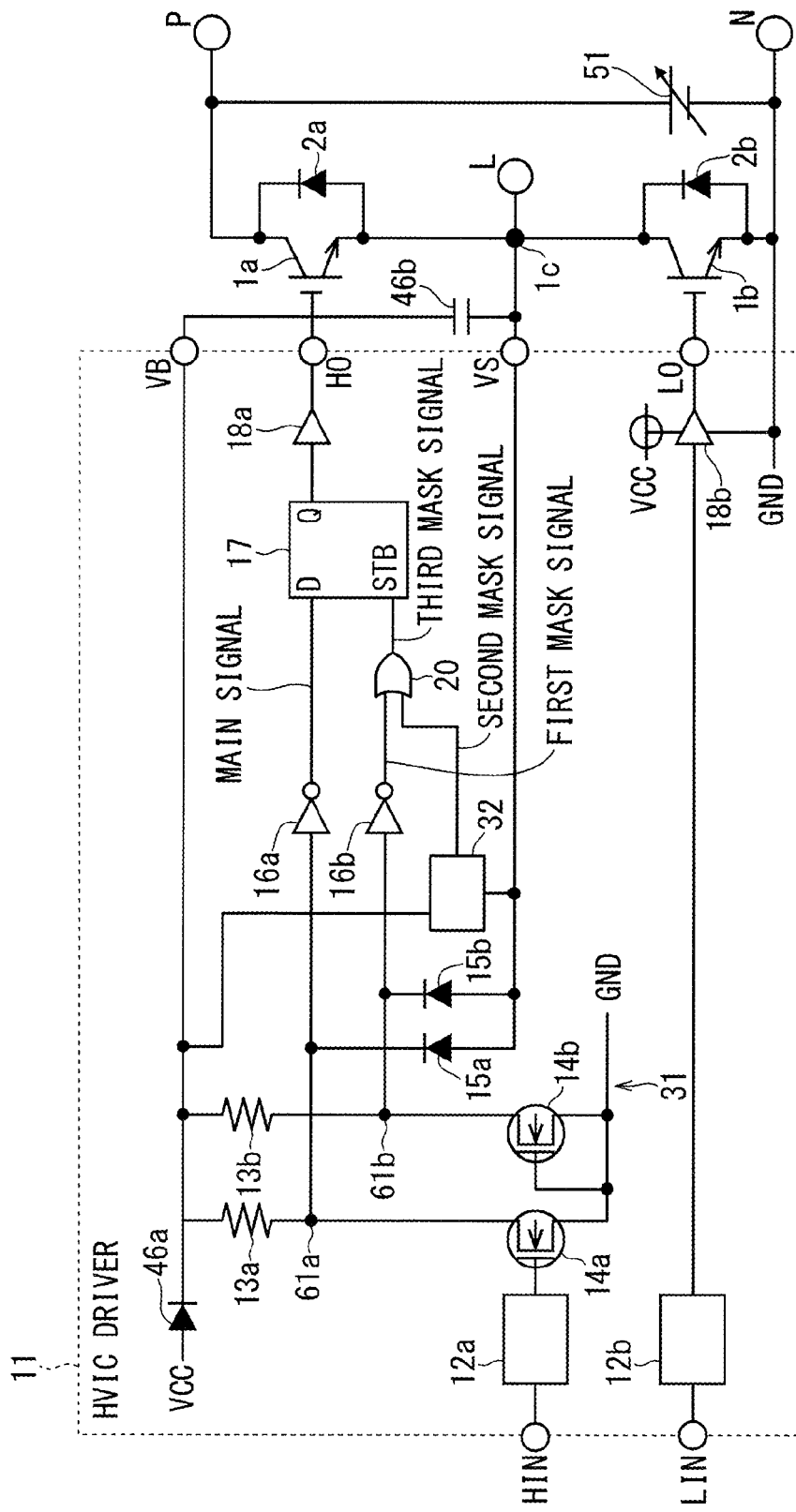
FIG. 16 is a circuit diagram showing a configuration of a semiconductor device according to a ninth preferred embodiment.

FIG. 16 is a circuit diagram showing a configuration of a semiconductor device according to a ninth preferred embodiment. In the ninth preferred embodiment, the same or similar structural components as those described in the first preferred embodiment are denoted by the same references, and differences will be mainly described below.

The semiconductor device shown in FIG. 6 includes the power supply 53 generating the VB potential (predetermined second potential). In contrast, the semiconductor device according to the ninth preferred embodiment shown in FIG. 16 is provided with a bootstrap circuit including a bootstrap diode 46a and a bootstrap capacitor 46b instead of the power supply 53.

An anode of the bootstrap diode 46a is connected to the VCC terminal to which the power supply 52 (FIG. 1) is connected. A cathode of the bootstrap diode 46a is connected to the VB terminal. The bootstrap capacitor 46b is connected between the VB terminal and the VS terminal. The bootstrap circuit having the configuration as described above can generate the power equal to the power supply 53 in the bootstrap capacitor 46b based on the power of the power supply 52. In other words, the bootstrap circuit can generate the power for generating the VB potential based on the power of the power supply 52 used for the N-side SW element 1b.

In the semiconductor device according to the ninth preferred embodiment as described above, upon the detection of the VS negative surge, the VB potential decreases from a VCC potential (potential at the VCC terminal) by the forward voltage VF. Therefore, the order of the potential upon the VS negative surge can be determined. As a result, the detection sensitivity of the VS negative surge can be improved.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A semiconductor driving device configured to drive a high-voltage side semiconductor switching element and a low-voltage side semiconductor switching element connected in series between a high potential and a low potential, said semiconductor driving device comprising:
- a negative surge detection circuit which compares a first voltage at a connection point between said high-voltage side semiconductor switching element and said low-voltage side semiconductor switching element to a second voltage that is greater than said first voltage to detect whether a negative surge occurs at said connection point between said high-voltage side semiconductor switching element and said low-voltage side semiconductor switching element; and
- a level shifter circuit that maintains a driving voltage used in driving said high-voltage side semiconductor switching element upon said negative surge detection circuit detecting occurrence of said negative surge.

2. The semiconductor driving device according to claim 1, wherein
- said negative surge detection circuit includes a first zener diode and a second zener diode, and
- upon occurrence of said negative surge, a potential between said first zener diode and said second zener diode is a predetermined potential.

3. The semiconductor driving device according to claim 2, wherein said negative surge detection circuit further includes an N-type metal-oxide-semiconductor field-effect transistor (MOSFET) configured to generate a detection signal indicating the occurrence of said negative surge in a case where the potential between said first zener diode and said second zener diode is said predetermined potential.

4. The semiconductor driving device according to claim 1, wherein said negative surge detection circuit includes a current mirror circuit configured to generate a detection signal indicating the occurrence of said negative surge upon the occurrence of said negative surge.

5. The semiconductor driving device according to claim 4, wherein said current mirror circuit includes two N-type MOSFETs.

6. The semiconductor driving device according to claim 4, wherein said current mirror circuit includes two bipolar transistors.

7. The semiconductor driving device according to claim 1, wherein
- said level shifter circuit is configured to maintain said driving voltage by, in response to a first potential at said connection point, a predetermined second potential, said low potential, and a detection result of said negative surge detection circuit, level-shifting a second signal generated based on said first potential, said second potential, and an input signal, and
- said semiconductor driving device further includes a delay circuit that delays said second signal which is level-shifted by said level shifter circuit with respect to said first signal used for level-shifting said second signal.

8. The semiconductor driving device according to claim 7, wherein said delay circuit delays said second signal upon said negative surge detection circuit detecting occurrence of a negative surge.

9. A semiconductor device comprising:
- a high-voltage side semiconductor switching element and a low-voltage side semiconductor switching element connected in series between a high potential and a low potential; and
- a semiconductor driving device configured to drive said high-voltage side semiconductor switching element and said low-voltage side semiconductor switching element,
- wherein said semiconductor driving device includes:
  - a negative surge detection circuit that detects which compares a first voltage at a connection point between said high-voltage side semiconductor switching element and said low-voltage side semiconductor switching element to a second voltage that is greater than said first voltage to detect whether a negative surge occurs at said connection point between said high-voltage side semiconductor switching element and said low-voltage side semiconductor switching element; and
  - a level shifter circuit that maintains a driving voltage used in driving said high-voltage side semiconductor switching element upon said negative surge detection circuit detecting occurrence of said negative surge.

10. A semiconductor device comprising:
- a high-voltage side semiconductor switching element and a low-voltage side semiconductor switching element connected in series between a high potential and a low potential;
- a semiconductor driving device configured to drive said high-voltage side semiconductor switching element and said low-voltage side semiconductor switching element;
- a delay circuit; and
- a bootstrap circuit, wherein
- said semiconductor driving device includes:
  - a negative surge detection circuit that detects whether a negative surge occurs at a connection point between said high-voltage side semiconductor switching element and said low-voltage side semiconductor switching element; and
  - a level shifter circuit that maintains a driving voltage used in driving said high-voltage side semiconductor switching element upon said negative surge detection circuit detecting occurrence of said negative surge,
- said level shifter circuit is configured to maintain said driving voltage by, in response to a first potential at said connection point, a predetermined second potential, said low potential, and a detection result of said negative surge detection circuit, level-shifting a second signal generated based on said first potential, said second potential, and an input signal,
- said delay circuit delays said second signal which is level-shifted by said level shifter circuit with respect to said first signal used for level-shifting said second signal, and
- said bootstrap circuit is configured to generate a power for generating said second potential based on a power of a power supply used for said low-voltage side semiconductor switching element.

* * * * *